United States Patent

[11] 3,574,988

| [72] | Inventor | Kenneth Ernest Buckman<br>Windsor, near Woodlands, England |
|---|---|---|
| [21] | Appl. No. | 826,449 |
| [22] | Filed | May 21, 1969 |
| [45] | Patented | Apr. 13, 1971 |
| [73] | Assignee | General Motors Corporation<br>Detroit, Mich. |
| [32] | Priority | May 22, 1968 |
| [33] | | Great Britain |
| [31] | | 24515/68 |

[54] AIR FILTERS
2 Claims, 7 Drawing Figs.

[52] U.S. Cl. .................................................. 55/418,
  55/510, 123/122, 285/184, 285/330
[51] Int. Cl. ........................................................ B01d 27/08
[50] Field of Search ............................................ 55/418,
  510, 419, 294, 505, 507; 285/184, 181, 330;
  123/119 (B), 119 (C8), 122 (D), 198 (E)

[56] References Cited
UNITED STATES PATENTS

| 128,303 | 6/1872 | Hammond .................... | 285/184 |
| 171,964 | 1/1876 | Syversen ..................... | 285/181 |
| 948,858 | 2/1910 | Henry, Jr. .................... | 285/181 |
| 1,527,383 | 2/1925 | Solliday ...................... | 285/7 |
| 2,555,742 | 6/1951 | Grue ............................ | 55/507 |
| 2,827,311 | 3/1958 | Kasper ........................ | 285/7 |

FOREIGN PATENTS

| 569,331 | 1/1959 | Canada ....................... | 55/418 |
| 1,280,722 | 11/1961 | France ........................ | 55/276 |

*Primary Examiner*—Frank W. Lutter
*Assistant Examiner*—Bernard Nozick
*Attorney*—P. A. Taucher and S. Carter

ABSTRACT: In order to enable the air intake tube of an air cleaner and silencer to be moved to a warm air or a cold air position the air intake tube and a spigot on the air cleaner casing have cooperating shoulders between which a circular spring is interposed and the end of the intake tube and the spigot have interengageable castellations by which the intake tube is secured against rotation from one position by the action of the spring but can be pulled axially to disengage the castellations and permit rotation of the tube to another position relative to the cleaner casing.

Patented April 13, 1971
3,574,988
3 Sheets-Sheet 1
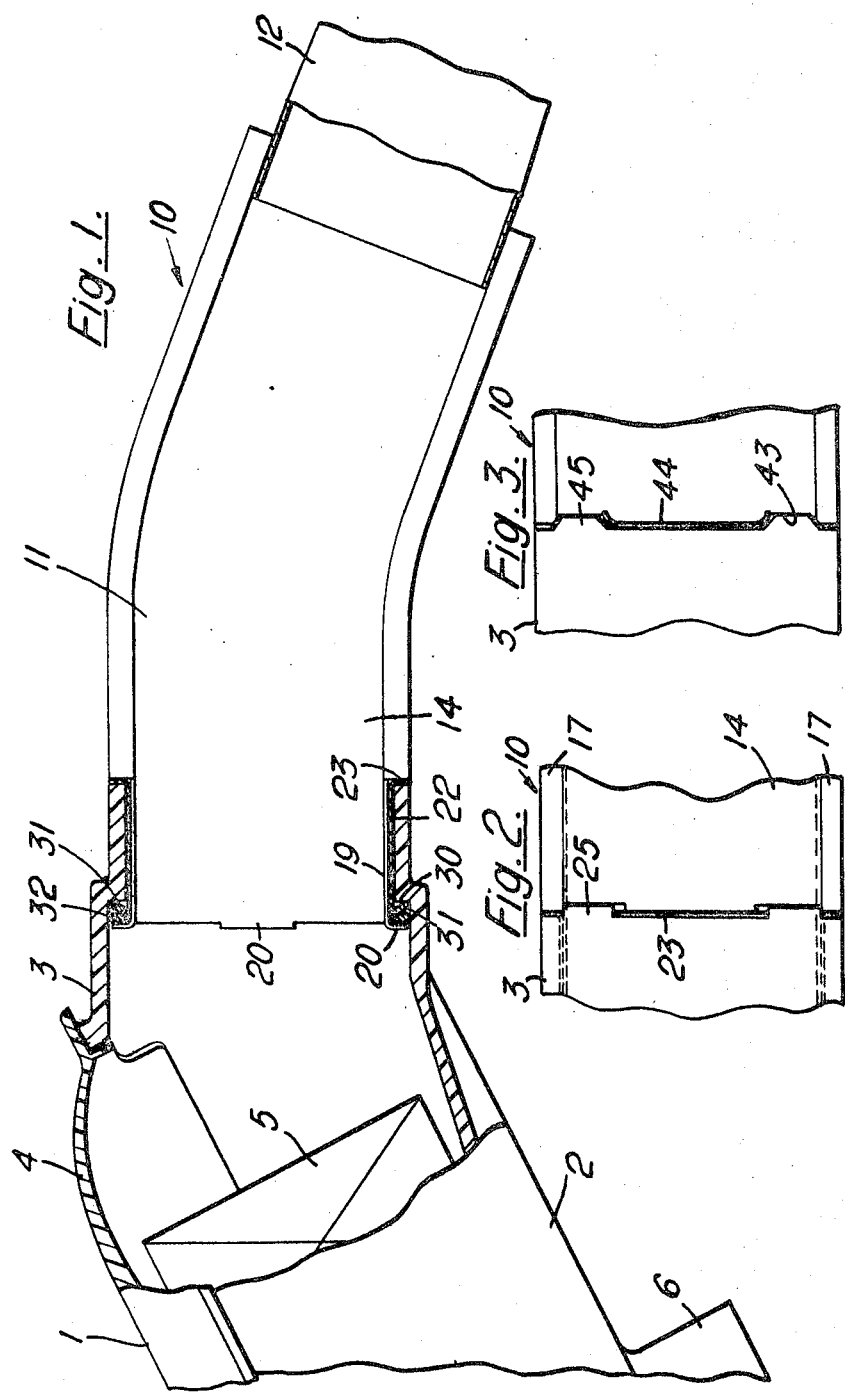
Inventor
Kenneth Ernest Buckman
BY
E. J. Biskup
Attorney Patented April 13, 1971

Inventor
Kenneth Ernest Buckman
BY
E.J. Bishup
Attorney

Patented April 13, 1971 3,574,988

Inventor
Kenneth Ernest Buckman
BY
E. J. Biskup
Attorney

AIR FILTERS

This invention relates to air filters and in particular to air filters for use with internal combustion engines to filter the air going to the air intake of the engine.

An air filter according to the present invention comprises a casing formed in two parts which are adapted to be detachably secured together and between which a filter element is adapted to be secured so that air entering by way of an inlet spigot on the casing passes through the filter element before leaving through an outlet in the casing; and an inlet tube with an end portion which is rotatably fitted in said spigot and has formations thereon which are interengageable with complementary formations on said spigot in one of a plurality of positions of relative rotation between said tube and spigot to secure the tube in such position.

Preferably the spigot and tube have cooperating shoulders between which a resilient member is interposed so that said spigot and tube are normally biased into one position of relative axial displacement in which said formations are interengaged but are movable against the bias of said resilient member into another position in which said formations are disengaged to permit relative rotation between said spigot and tube.

The spigot may have an inner shoulder and the end portion of the inlet tube have a corresponding peripheral projection between which said resilient member is interposed; and the end of the spigot may have castellations or similar formations which are interengaged with corresponding formations on the inlet tube adjacent said end portion when the end portion of the inlet tube is pressed by said resilient member to the limit of its axial movement within the spigot. In order to change the positions of relative rotation between the inlet tube and spigot the inlet tube is pulled outwardly against the bias of the resilient member until the castellations or like formations on the tube and spigot are disengaged and is then rotated about the common axis of the end portion of the inlet tube and the spigot to a desired new position and then released, the resilient member then pressing the inlet tube inwardly of the spigot to engage the castellations or like formations and secure the inlet tube in its new position of rotation relative to the spigot.

With this construction the free end of an inlet tube which has an axis noncoincident with that which is fitted in the spigot, is brought by rotation of the tube relative to the spigot into a different position in which it may take in air from a position close to the engine whereas in the first position it takes in air from a position remote from the engine. Thus the arrangement enables the air inlet of the filter to be readily changed from one position, for use in summer conditions, in which cold air is drawn into the engine to another position, for winter conditions, in which warmed air is drawn into the engine.

The scope of the invention is defined by the appended claims; and the invention and the method by which it is to be performed are hereinafter particularly described with reference to the accompanying drawings in which:

FIG. 1 is a part sectional elevation of an air filter according to the invention, showing the air inlet tube and part of the filter casing;

FIG. 2 is a detail elevation of FIG. 1;

FIG. 3 is a detail elevation of a modification of FIG. 1;

Figure 4:
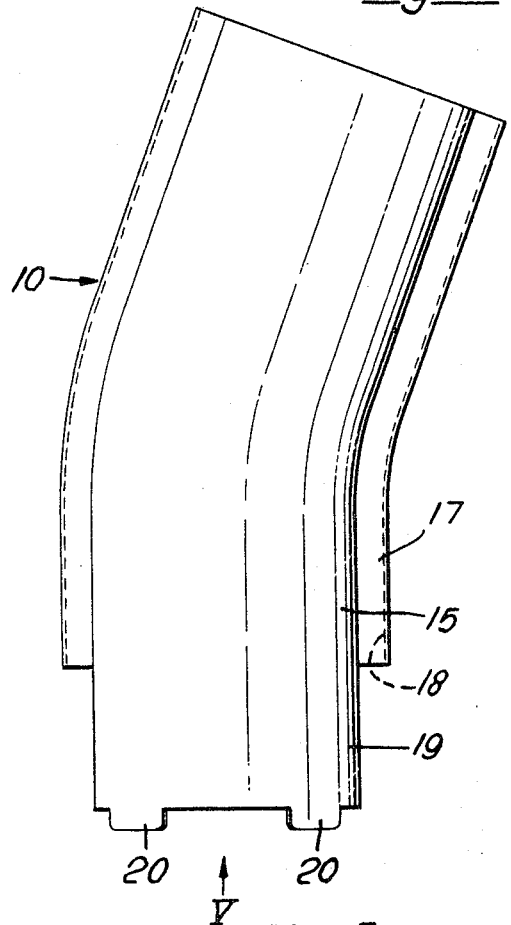
FIG. 4 is a plan of the air inlet tube shown in FIG. 1.

In one preferred embodiment of the invention shown in FIGS. 1 and 2 the air filter casing 1 is formed of a body part 2, including an inlet spigot 3 extending therefrom and a cover part 4 which is adapted to be secured, as by means of screws (not shown), to the body part 2 to form an airtight casing in between the two parts of which a filter element 5 is secured so that air entering by way of the inlet spigot 3 passes through the element 5 before leaving the casing 1 by way of an outlet tube 6 in the base of the body 2.

The cover 4 and body 2 of the casing 1 are conveniently made of a plastics material such as polypropylene.

An air inlet tube 10 adapted to be fitted into said inlet spigot 3 is conveniently formed from sheet metal pressings and includes a curved portion 11 so that the end portion 12 of the inlet tube 10 at which air enters has an axis which is at an angle to the other end portion 14 of the tube 10 which fits into said spigot 3.

Figure 5:
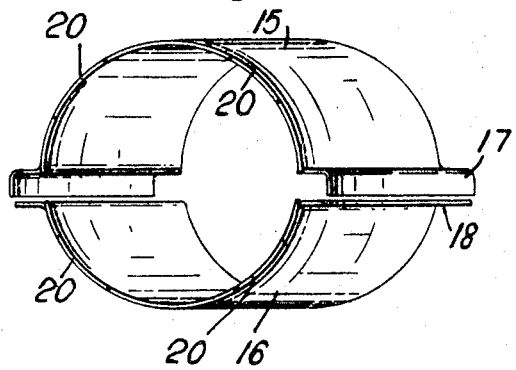
FIG. 5 is an elevation of FIG. 4 viewed in the direction of the arrow V.
Figure 6:
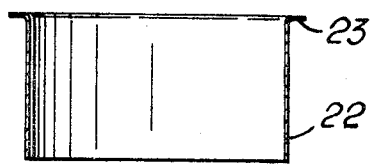
FIG. 6 is a vertical section of strengthening tube which forms part of the air inlet tube shown in FIG. 1.
Figure 7:
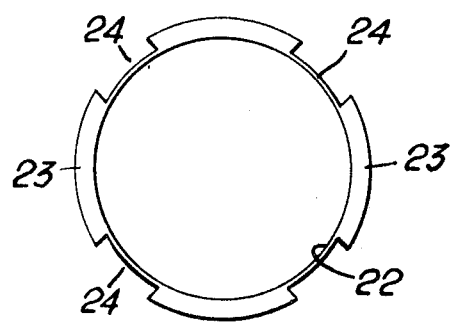
FIG. 7 is a plan of FIG. 6.

As shown in FIGS. 4 to 7 the inlet tube 10 is formed of two metal pressings 15, 16 each of semicircular section, the pressing 15 having at each side thereof a rectangular flange 17 which is crimped over a plain flange at each side of the pressing 16 to form a sealed joint therewith. The joint may be additionally secured by welding.

An end portion 19 of each pressing at the end 14 of the inlet tube 10 is left free of the flanges 17, 18, to permit the insertion of the end 14 within the air filter casing 1, such end portions 19 also being provided with a plurality of projections or lugs 20.

Prior to its insertion into the spigot 3 of the air filter casing 1 the unflanged part of the end of the intake tube 10 has fitted thereover, and secured thereto by welding, a short strengthening tube 22 (FIGS. 6 and 7) one end of which has a peripheral flange 23 in which are formed a plurality of rectangular notches or like formations 24.

As shown in FIG. 2, the free end of the spigot 3 has formations complementary to those provided by the notched flange 23 on the strengthening tube 22 fitted on the end portion 14 of the intake tube, such formations providing projections 25 which interengage with the notches 24 on the tube 22.

The spigot 3 is formed with an internal annular shoulder 30, and in order to permit limited relative axial movement between the intake pipe 10 and the spigot 3 to permit disengagement of the interengaged formations 24, 25 on the intake tube 10 and spigot 3 respectively a spring 31 formed as an undulatory ring is seated at one side on the shoulder 30 and at the other side on a shoulder provided by a washer 32 which is interposed between said other side of the spring 31 and the lugs 20 on the end portions 19 of the intake tube, such lugs being peened over to engage the washer 32 after the end portions 19 of the intake tube 10 have been inserted within the end of the spigot 3. The lugs 20 are shown out of their true positions in FIG. 1, for the sake of clarity.

In use, when it is desired to rotate the intake tube angularly relative to the spigot 3 the intake tube 10 is pulled outwardly relatively to the spigot 3, against the resistance of the spring 31, such movement disengaging the castellated formations 24 and 25 on the tube 22 and spigot 3, whereafter the inlet tube 10 can be rotated about the common axis of the tube portion 14 and the spigot 3 and then released to permit the bias of the spring 31 to effect reengagement of the formations 24, 25 with the intake tube 11 in a different position of angular movement relative to the spigot 3.

FIG. 3 shows a modification of the construction shown in FIGS. 1 and 2 to 7 in which the interengaged formations on the spigot and inlet tube comprise notches 43 which alternate with portions of a flange 44 on the intake tube 10, and projections 45 on the spigot 3, the circumferential ends of the flange portion 44 and the sides of the projections 45 being inclined so as to give a degree of cam action by which the spigot 3 and intake tube 10 will be moved axially relatively to each other, to disengage the formations 43, 45, upon rotation of the intake tube 10 relative to the spigot 3.

The wire spring 31 between the peened over lugs 20 and the shoulder 30 could be replaced by another resilient member, for example a rubber ring.

As an alternative to the fabrication of the inlet tube 10 from metal pressings it may be made wholly or partly from plastics, the end portion 12 thereof, which is likely to be in close proximity to a heated part of the engine, preferably being made from metal.

I claim:

1. In an air cleaner having a casing comprising a body and a cover detachably secured to said body, a filter element within said casing to filter air entering said air cleaner by way of an inlet spigot on the casing wherein air passes through the filter element before leaving through an outlet in said casing; wherein the improvement comprises: an inlet tube having one end portion mounted in said spigot, a strengthening member attached on said one end portion of said inlet tube having castellated formations which are engageable with complementary castellated formations on said spigot in one of a plurality of positions of relative rotation between said tube, spigot, and strengthening member to secure said tube against rotation; said spigot and tube each having cooperating shoulders wherein the shoulder on said spigot is an internal shoulder with the end portion of the inlet tube having a corresponding external peripheral projection forming a complementary shoulder thereon, a resilient member being interposed between said cooperating shoulders so as to normally bias said spigot, tube, and strengthening member into a position of relative axial displacement in which said castellated formations are interengaged, said spigot, tube, and strengthening member being relatively axially movable against the bias of said resilient member into another position in which said formations on said spigot and separate member are disengaged to permit relative rotation between said spigot, tube, and strengthening member and reengagement of said formations under the bias of said resilient member, in a different position of relative rotation between the spigot and tube.

2. In an air cleaner having a housing formed in two parts detachably secured together, said housing having an inlet and an outlet, a filter element clamped between said housing parts so that air entering the casing by way of said inlet passes through said element before leaving through said outlet, the improvement comprising: the inlet having a spigotlike extension thereon having a plurality of toothlike formations, an inlet tube having one end within said extension, a member fitted over and attached to said inlet tube at said one end and having a plurality of notches thereon, said toothlike formations on said extension and the notches on said member being engageable with each other in a plurality of positions of relative rotation between said extension, inlet tube, and member, an internal shoulder in said extension; an external shoulder on said one end of the inlet tube; and a resilient member interposed between said shoulders, said resilient member biasing said extension and inlet tube into said one position of relative axial displacement and said extension, inlet tube, and member being relatively axially displaceable against the bias of said resilient member to disengage said toothlike formations from the notches and permit relative rotation between said extension and inlet tube and reengagement of said toothlike formations with the notches under the bias of said resilient member in a new position of relative rotation between said extension and inlet tube, wherein said toothlike formations have cam faces that cooperate to initiate disengagement of said formations upon relative rotation between said inlet tube and extension.